United States Patent [19]

Hiratake et al.

[11] 4,169,962

[45] Oct. 2, 1979

[54] HEAT TREATING APPARATUS

[75] Inventors: Susumu Hiratake, Kasugaishi; Mitsuhiro Matsui, Nagoya, both of Japan

[73] Assignee: Daidoseiko Kabushikikaisha, Nagoya, Japan

[21] Appl. No.: 803,821

[22] Filed: Jun. 6, 1977

Related U.S. Application Data

[62] Division of Ser. No. 619,087, Oct. 2, 1975.

[30] Foreign Application Priority Data

Oct. 2, 1974 [JP] Japan ............................. 49/114216
Oct. 12, 1974 [JP] Japan ............................. 49/117265

[51] Int. Cl.² ..................................... H05H 1/02
[52] U.S. Cl. ............................................. 13/2 P
[58] Field of Search ............... 13/1, 2, 2 P, 9, 11, 13/18; 219/123, 121 P

[56] References Cited

U.S. PATENT DOCUMENTS 3,541,625 11/1970 Burggraaf .................. 13/1
3,852,061 12/1974 Wulff ...................... 13/9 X

*Primary Examiner*—R. N. Envall, Jr.
*Attorney, Agent, or Firm*—William Anthony Drucker

[57] ABSTRACT

A heat treating apparatus including a crucible to contain molten metal, at least one plasma ejecting nozzle which is constructed so as to generate a plasma jet and is secured with respect to the crucible around the central axis of it and a magnetic field generating means to generate a magnetic field interacting with the plasma jet and deflecting it.

9 Claims, 7 Drawing Figures

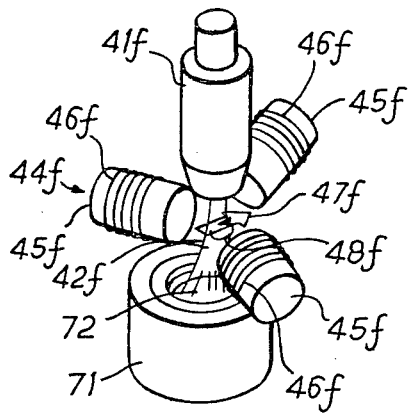
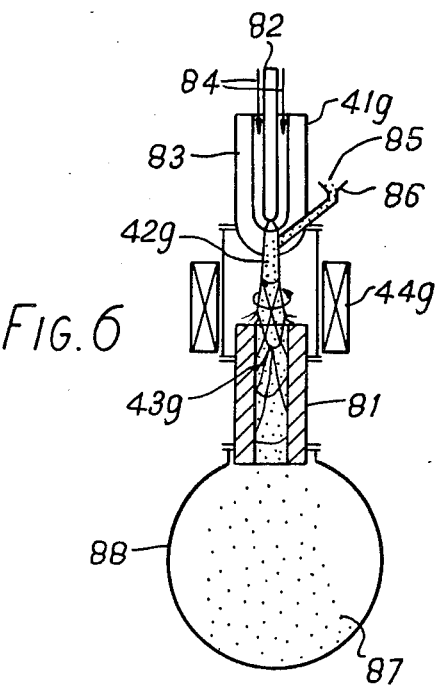
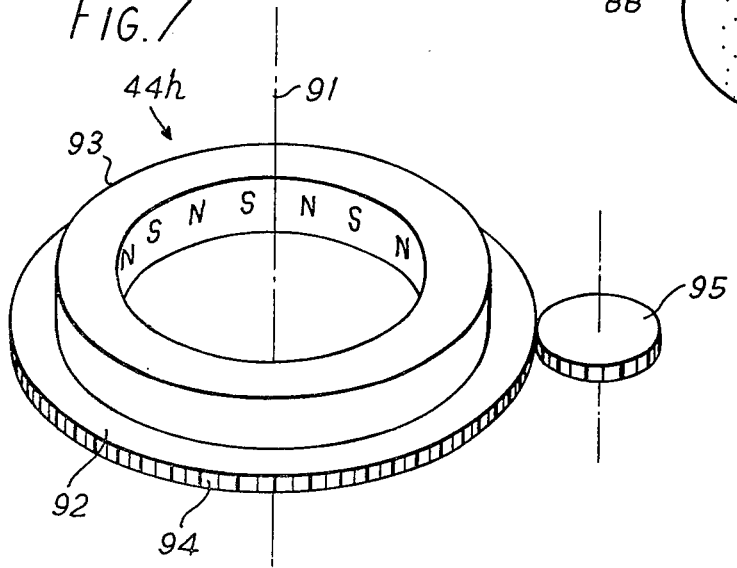

HEAT TREATING APPARATUS

BACKGROUND OF THE INVENTION

This application is a Division from our co-pending United States patent application Ser. No. 619,087 filed Oct. 2, 1975.

This invention relates to a heat treating apparatus in which metals in various forms such as powders or rods are melted by gaseous plasmas.

Such a heat treating apparatus is conventionally known in which metals are melted with a gaseous plasma ejected from nozzles in the form of a plasma jet. However, molten metal in a cooling crucible of a heat treating apparatus making use of a single plasma jet assumes a funnel-shaped form and so generated ingots are a inhomogeneous structure with characteristic patterns. This inhomogeneity itself of ingots leads to a disadvantage of decreasing the mechanical strength of metallic material. On the other hand, when the metal to be melted includes non-metallic components, the non-metallic components in a molten pool are forced into the inner portion of the ingot by crystallization surfaces, which results in the contraction and split of the ingot and makes difficult the mechanical work up of the ingot.

This inhomogeneity in the ingot is moderated considerably by arranging a plurality of plasma jets around the central axis of the apparatus and effectuating sectionalized heating. This inhomogeneity is moderated further by setting and fixing the plural plasma jets beforehand such that the jetting velocities of the plural plasma jets have components in the circumferential direction of the apparatus. In this case, the molten metal is caused to revolve around the axis of the apparatus by the kinetic energy of the plasma jets. However, if the sectionalized heating and the revolution of the molten metal are to be done effectively by the plural plasma jets, the positions and directions of the nozzles must be set precisely aforehand based on the analysis of the estimate of the flow pattern and the temperature distribution of the molten metal. Moreover, when the operating conditions of the heat treating apparatus vary according to the components of raw metal and the requirement on the constitution of the ingot, the plural nozzles must be rearranged for an optimum condition.

SUMMARY OF THE INVENTION

A heat treating apparatus according to the present invention has not only plasma jets but also a magnetic field generating means to generate a magnetic field in a suitable direction not parallel with the direction of the direct current flowing in the plasma. The plasma current for heating flows through a negative electrode in a nozzle and the plasma jet and interacts with the magnetic field electro-magnetically at the plasma jet. The plasma jet is deflected such that its jetting velocity has a component in the circumferential direction around the central axis of the apparatus. The arrangement of plural plasma jets thus attained as the result of the deflection by magnetic field is equivalent to that due to the setting of plural nozzles. The degree of the deflection or the position of the plasma jets can be adjusted easily by controlling the current for the magnetic field. The interaction of a direct plasma current with an alternating magnetic field deflects the plasma jet oscillatingly with a constant amplitude around an undeflected average position. The interaction of the direct plasma current with an alternating current superposed on a direct current deflects the plasma jet oscillatingly around a deflected average position. According to the aforesaid features, the control of the deflection of the plasma jet and therefore the sectionalized heating and the revolution of the molten pool can be done simply by controlling the current for the magnetic field. The feasibility in this control contributes to production of homogeneous ingots and enlarges the range of application of the heat treating apparatus.

In the present invention, a plasma is subjected also to a rotating magnetic field and is rotated together with it. A centrifugal force is then exerted on the plasma as a result of its rotation and thickens the plasma. This or enlarged thickened plasma can be used advantageously when a plasma is to be projected wholly on a wide range for heat treatment. For example, when metallic or non-metallic materials to be treated are melted, they can be treated wholly and homogeneously and have improved quality after treatment. Further, as the plasma is rotated by the rotating magnetic field and then enlarged mechanically by the resulting centrifugal force, even a weak rotating magnetic field sufficient solely to rotate the plasma can thicken the plasma largely. Thus, the plasma can be thickened effectively for a certain constant energy to maintain the rotating magnetic field. Still further, the application of the rotating magnetic field on the plasma consisting of electrically conductive gas gives a possibility that the electrically conductive gas is supplied with energy electromagnetically and heated to a higher temperature.

In the drawings:

FIG. 5 is an abbreviated perspective view showing an example of melting apparatuses.

FIG. 6 is an abbreviated front elevational view of a chemical reaction apparatus.

FIG. 7 is a perspective view showing a different embodiment of the means to generate the rotating magnetic field, and;

Figure 1:
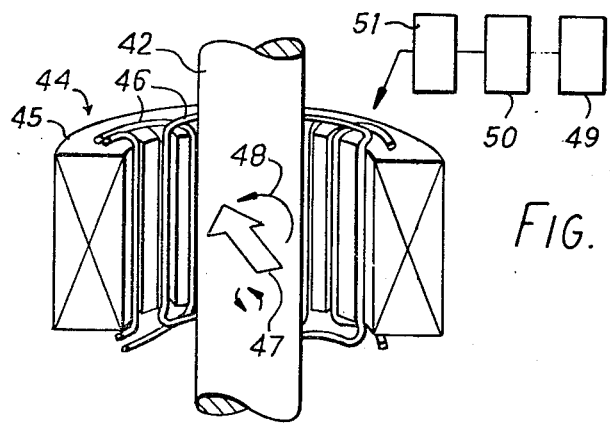
FIG. 1 is a perspective view partly in section of a means to generate a rotating magnetic field.
Figure 2:
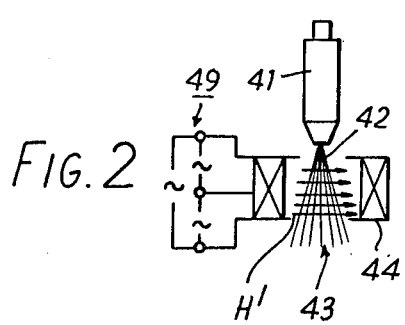
FIG. 2 is an abbreviated front elevational view of a heat treating apparatus making use of a rotating magnetic field.
Figure 3:
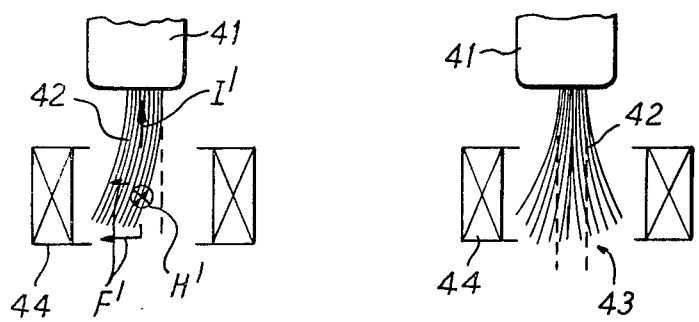
FIG. 3 is a view showing the deflection of the plasma shown in FIG. 2.

Referring to FIGS. 1–3, numeral 41 represents a device from which an electrically conductive gas at high temperature is ejected and which is called generally a plasma torch. Various plasma torches generally known can be used such as those of transfer type or non-transfer type. Numeral 42 shows a plasma ejected from the plasma torch 41 and numeral 43 represents a treatment region where the plasma is projected and an object to be treated, is heat-treated. Next a rotating magnetic field generating means 44 mounted near by the plasma 42 is described. Numeral 45 shows an iron core which is similar to that of the stator of an electric motor. Numeral 46 shows coils wound on the iron cores 45 in a usually known but arbitrary manner and the coils are connected electrically such that it can produce a rotating magnetic field to be described below when it is fed from a three-phrase (or other multi-phase) alternating current power source. An arrow 47 shows the direction of the magnetic field produced by the coils 46 and this direction rotates along an arcuate arrow 48 according to the change of the phases of the power source feeding the plural coils 46. The rotational direction shown by the arcuate arrow 48 may be reversed or changed oppositely after a certain time interval or by a certain angle. Numeral 49 represents a three-phase commercial frequency power source. This power source can be understood as an other multi-phase alternating current power source. In such case, the aforesaid coils are connected correspondingly. Next, a control means to adjust the properties of the rotating magnetic field is described. Numeral 50 represents a rotating speed adjusting means which is constructed so as to change the rotational speed of the rotating magnetic field by changing the frequency of the power source feeding the rotational magnetic field generating means 44 with a frequency converter or by changing the connection of the coils to change the number of the poles of the means 44. Numeral 51 represents a field intensity adjusting means which changes the voltage or the current of the power source feeding the means 44 to adjust the intensity of the magnetic field generated by said means. The rotating speed adjusting means 50 and the field intensity adjusting means 51 may be exchanged in the order of electrical connections.

In the apparatus constructed as mentioned above, a magnetic field rotatable in the direction shown by the arrow 48 is applied to the plasma 42 in a direction crossing the axis of the plasma as shown by the arrow 47 in FIG. 1. Then, the electrically conductive plasma 42 is rotated in the same direction as that of the rotating magnetic field (the arrow 48) according to the operational principle of a well-known induction motor. When the plasma 42 is thus rotated, a centrifugal force acts on the plasma to extend it outwardly and the plasma 42 is projected on a wider region for treatment as shown in FIG. 2. The extent of the enlargement of the plasma 42 is determined by the rotational speed of the plasma 42 and this rotational speed depends on the intensity and the rotational speed of the rotating magnetic field. Thus, the volume of the plasma 42 extended by the rotating magnetic field can be controlled ultimately any one of the capacity, the number of phases and the frequency of the alternating power source and the number of poles of the magnetic field generating means 44.

On the other hand, if the plasma 42 is a plasma generated by the plasma torch 41 of transfer type, then a current I' flows in the plasma in the direction opposite to the plasma flow as shown in FIG. 3 (A). This current interacts with the magnetic field H' to be subject to a force F' in accordance with Fleming's left hand law and the plasma is deflected as a whole as shown. Because the magnetic field H' is always rotating as mentioned, the deflected plasma seems to be enlarged as shown in FIG. 3 (B) if it is observed in a long time interval (longer than the period of the rotating magnetic field) comparable with the time during which the heat treatment of the object is done.

In this case, the extent of the enlargement of the plasma 42 is controlled by the current I' flowing in the plasma as well as the factors aforesaid in the case of previous embodiments.

Figure 4:
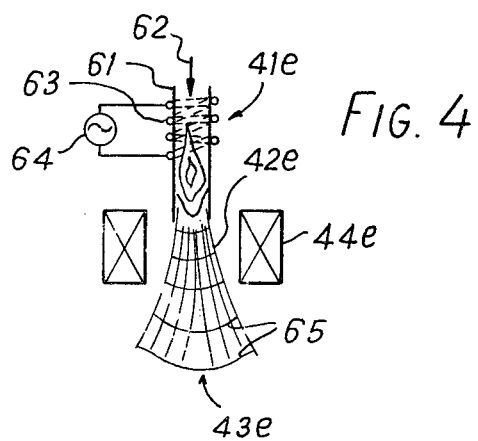
FIG. 4 is a view showing an arrangement to enlarge an inductively produced plasma.

Next, FIG. 4 shows an embodiment in which an inductively produced plasma is enlarged. In a plasma torch 41e of this embodiment, a gas, which is introduced into a heatproof pipe 61 such as a quartz tube in a direction shown by an arrow 62, is heated inductively by a coil 63 which is wound on the heatproof pipe 61 and fed by a high frequency power source 64. The gas is changed into a plasma 42e which is ejected. The plasma 42e thus generated is rotated by the rotating magnetic field and enlarged due to the resulting centrifugal force as in the previous case. When the plasma 42e is subject to the rotating magnetic field generated by the rotating magnetic field generating means 44e, an induced current flows in the plasma and so the plasma is heated also by this induced current. Because the plasma is more heated at its surface rather than in its interior by induction heating on account of the skin effect, the rotating magnetic field has an effect to heat the surficial portion rather at a low temperature by its nature besides the enlargement of the plasma. This effect further contributes to the homogeneous heating of the plasma. Thus, the enlarged plasma 42e with a wide and homogeneous temperature distribution as shown with contour-lines 65 is projected on the treatment region 43e. In this embodiment, those members are given the same reference numerals with alphabetical suffices as in FIGS. 1-3 which are same in construction or function as corresponding members in these figures and repeated description has been omitted. (Also in the following figures, alphabetical suffices f or g are affixed to the same reference numerals according to the similar concept and the repeated explanation is omitted).

Next, FIG. 5 shows an example of an apparatus in which an object to be treated is melted. In this embodiment, numeral 71 represents a container having a treatment region formed at its central part. This container is made of heatproof material or copper and is adapted to be cooled by a coolant such as water. Numeral 72 represents such a material to be melted as tin, other metal or other raw material to be melted and it is put in the container 71. In this apparatus, the enlarged plasma 42f is projected widely on the material to be melted and so that material 72 is melted homogeneously without boiling resulting from the heating developed locally and without leaving any unmolten portion. When the material 72 is melted while it is thrown in the container 71, the material 72 newly thrown in is heated quickly by the unenlarged plasma directed towards the material 72 and then heated as a whole and homogeneously by the enlarged plasma. In this case, the operation to direct the plasma 42f to the material 72 to be melted is established by eliminating the rotating magnetic field or by deflecting the plasma 42f with a magnetic field not rotating.

Next, FIG. 6 shows an apparatus in which powdered or granular materials to be treated are made to react chemically. In this embodiment, such a plasma torch 41g of transfer type is used in which a direct current voltage is applied between a ring-shaped or cylindrical positive electrode 81 and a negative electrode 82 and a gas introduced through between a nozzle 83 and the negative electrode 82 as shown by an arrow 84 is ionized, to be ejected out. Of course, this gas is one which is required in order to make the materials to be treated react. The material to be treated 85 is thrown through a raw material conduit 86 and mixed with a plasma 42g ejected from the torch 41. (The material to be treated is coal when coal is decomposed with heat or when acetylene, carbon monoxide or hydrogen is produced through synthesis or reduction from coal reacting with atmospheres such as hydrogen, carbon dioxide, air or water vapour or the material to be treated is aluminum when aluminum nitride is to be produced through the nitrification of powered aluminum by a nitrogen plasma). The material 85 introduced reacts in the plasma 42g (in this case, the whole region of the plasma 42g is the treatment region,) and a resulting product 87 is withdrawn into a collecting chamber 88. Also in this case, the plasma is rotated and enlarged by applying the rotating magnetic field and thus the low temperature layer existing between the plasma and the positive electrode in the absence of the rotating magnetic field is reduced, the concentrated plasma energy being dispersed resulting in homogeneous distribution of temperature. Consequently the material 85 has more chances of contacting with the enlarged plasma than with the unenlarged plasma and the difference in reactions of the powdered material passing through the central portion of the plasma and that passing through the outer portion is reduced because of the homogeneous temperature distribution. Thus, the resulting product is very homogeneous as a whole. The same effect is obtained also without using the ring-shaped positive electrode if the rotating magnetic field generating means is mounted around a nozzle of a nontransfer type plasma torch in which a plasma jet is ejected from the nozzle as the result of a discharge between the nozzle and a negative electrode or around the inductively produced plasma ejected together with raw material as shown in FIG. 4.

Next, FIG. 7 shows a different embodiment 44h of the rotating magnetic field generating means which comprises a holding frame 92 supported rotatably around the central axis 91 of the plasma in a well-known manner and a plurality of magnets 93 set on the inside surface of the holding frame 92 with alternating N and S poles. The magnet 93 may be a permanent magnet or an electromagnet which is fed from a power source through usual sliprings. On the outside surface of the holding frame 92, a gear 94 is formed, which is in mesh with and actuated by a driving gear 95 connected to a driving source such as an electric motor.

In the means thus constructed, the rotational speed of the rotating magnetic field is controlled by changing that of the driving source and the intensity of the rotating magnetic field is changed by adjusting the current to an electromagnet if it is used as the magnet 93.

The electrically conductive gas introduced into pipe 101 is rotated by the rotating magnetic field in the region 102 and is simultaneously subjected to induction heating to be changed into plasma. When this plasma in a rotating state is ejected from an end of the pipe 101, it is widened as indicated by the arrow by centrifugal force in a manner similar to that as described in connection with apparatus shown in FIGS. 1-3 so that the plasma is projected over the wide treatment region.

We claim:

1. A heat treating apparatus comprising:
   (i) means for supporting material to be heat treated at a treatment region
   (ii) a plasma torch positioned in spaced relationship with respect to said treatment region for producing and ejecting towards said treatment region a plasma for treatment of said material at said region
   (iii) means for generating a rotating magnetic field acting between said plasma torch and said treatment region, the direction of the rotating magnetic field crossing the axis of said plasma, the direction of the magnetic field rotating unidirectionally about the axis of said plasma, whereby said plasma is caused by the rotation of said magnetic field to rotate between said plasma torch and said treatment region such that said plasma is in a state of rotation about its axis as it reaches said material to be treated.

2. A heat treating apparatus, as claimed in claim 1, comprising control means for adjusting the properties of said rotating magnetic field, said control means being connected to said means for generating a rotating magnetic field.

3. A heat treating apparatus, as claimed in claim 1, wherein said means for generating a rotating magnetic field comprises electromagnet means fed with multi-phase current.

4. A heat treating apparatus, as claimed in claim 3, comprising control means for adjusting properties of said rotating magnetic field, said control means being connected to said means for generating a rotating magnetic field, said control means including selectively means for changing the frequency of a current feed to said electromagnet means and means for changing the intensity of a current feed to said electromagnetic means.

5. A heat treating apparatus, as claimed in claim 1, wherein said means for generating a rotating magnetic field comprises a three-phase coil, and wherein said apparatus further comprises a three-phase AC power source connected to said three-phase coil.

6. A heat treating apparatus comprising:
   (i) means for supporting material to be heat treated at a treatment region
   (ii) means positioned in spaced relationship with respect to said treatment region for producing and ejecting towards said treatment region a plasma for treatment of the material at said region
   (iii) a plurality of magnets disposed about said plasma and acting to apply a magnetic field to said plasma between said plasma ejecting means and said treatment region, said magnets being rotatable about said plasma so as to produce a rotating magnetic field such that said plasma is in a state of rotation as it reaches said material to be treated.

7. A heat treating appartus, as claimed in claim 6, wherein a plurality of magnets are carried on a holder disposed about the plasma, said magnets having their poles, presented towards the plasma, of alternate polarities considered in order about said holder.

8. A heat treating apparatus, as claimed in claim 7, wherein said magnets are permanent magnets.

9. A heat treating apparatus, as claimed in claim 7, wherein said magnets are electromagnets, and wherein slip ring means are provided on said holder to coact with feed shoe means for feeding current to said electromagnets.

* * * * *